United States Patent [19]
Broecker et al.

[11] 3,959,198
[45] May 25, 1976

[54] PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

[75] Inventors: Bernhard Broecker, Hamburg; Richard Schardt, Oststeinbek, both of Germany

[73] Assignee: Hoechst Aktiengesellschaft, Germany

[22] Filed: May 15, 1974

[21] Appl. No.: 469,956

[30] Foreign Application Priority Data
Mar. 9, 1974  Germany............................ 2411418

[52] U.S. Cl........................ 260/23.7 A; 260/23.7 R
[51] Int. Cl.².......................................... C08L 91/00
[58] Field of Search................... 260/23.7 A, 23.7 R

[56] References Cited
UNITED STATES PATENTS

| | | | |
|---|---|---|---|
| 2,905,649 | 9/1959 | Craig | 260/23.7 A |
| 3,422,044 | 1/1969 | Erikson | 260/23.7 A |
| 3,518,213 | 6/1970 | Miyushi | 260/22 |
| 3,681,276 | 8/1972 | Nagahisa | 260/23.1 R |
| 3,689,446 | 9/1972 | Furuya | 260/23.7 R |
| 3,705,866 | 12/1972 | Shibata | 260/23.7 A |
| 3,789,046 | 1/1974 | Heidel | 260/23.7 A |

FOREIGN PATENTS OR APPLICATIONS
1,154,174  6/1969  United Kingdom

*Primary Examiner*—Donald E. Czaja
*Assistant Examiner*—William Parker
*Attorney, Agent, or Firm*—Gordon W. Hueschen

[57] ABSTRACT

The subject of the invention is a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process.

16 Claims, No Drawings

PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

BACKGROUND OF THE INVENTION

U.S. patent application Ser. No. 449,618 filed Mar. 11, 1974 (priority: Switzerland No. 3619/73 of Mar. 13, 1973) relates to a process for the manufacture of heat-curable synthetic resins, based on reaction products of maleic anhydride with mixtures of polybutadiene, unsaturated hydrocarbon resins and unsaturated fatty acid glyceride ester, which can be diluted with water and are suitable for the electrophoretic coating process, characterised in that a mixture consisting of:

a. 20 – 60% by weight of a polybutadiene having an average molecular weight of 750 – 2,000 and an iodine number between 300 and 450, b. 10 – 60% by weight of a hydrocarbon resin of predominantly aliphatic structure, having a viscosity between 30 and 800 cP (measured in 70% strength solution in toluene at 20°C) and an iodine number between 160 and 400, consisting of $b_1$. 20 – 80% by weight of polyisoprene, $b_2$. 5 – 35% by weight of cyclopentadiene and/or dicyclopentadiene, $b_3$. 5 – 50% by weight of further mono-unsaturated or poly-unsaturated hydrocarbons with 5 – 6 C atoms which are of predominantly aliphatic or cycloaliphatic structure and c. 5 – 40% by weight of a fatty acid glyceride ester, wherein the fatty acid radical contains 16 – 18 C atoms and the fatty acid glyceride ester has an iodine number between 140 and 220, is pre-polymerised by heating to 200° – 270°C until the reaction mixture of components $a$, $b$ and $c$, which has an initial viscosity of about 100 – 300 sec (measured according to DIN 4 sec 53,211), displays viscosities between 500 and 2,000 sec (measured according to DIN 4 sec 53,211), the resulting mixture is then reacted with d. 10 – 20% by weight of maleic anhydride at 180° to 190°C until no further free maleic anhydride is present and e. in the resulting adducts the anhydride groups present are opened by hydrolysis with water or by alcoholysis with the amount of monohydric alcohols with 1 – 4 C atoms required to form the half-ester.

The process of U.S. patent application Ser. No. 449,618 gives heat-curable synthetic resins which can be diluted with water, are suitable for the electrophoretic coating process and are distinguished by very good resistance to salt spray, good throwing powers, good film hardness and low sensitivity of the rinsed, but not yet stoved, films to drops of water. However, a continuing disadvantage of the binders described in U.S. patent application Ser. No. 449,618 is that at high deposition potentials, say above 300 volt, the binders tend to excess-coating, that is to say coating thickness of 30 $\mu$ and above are obtained on the metal sheets to be coated.

An object of the present invention is to provide a process for the manufacture of synthetic resins of this type which when used as binders no longer show this disadvantage and which, for these reasons, are distinguished by even better values of the throwing power and excellent voltage resistance; this means that the breakdown voltage, measured in volt, during electrical deposition is relatively high. The binders manufactured according to the invention should be capable of deposition over a wide voltage range without a danger of excess-coating, that is to say in coating thicknesses of 20 – 22 $\mu$.

In the process of the present invention, this is achieved by using, additionally to the components (a) to (d) of U.S. Patent Application Ser. No. 449,618, a component (f), which consists of an adduct of an $\alpha,\beta$-unsaturated aliphatic dicarboxylic acid to a resin acid, it being possible for these adducts to be partially or completely esterified with saturated polyhydric alcohols.

SUMMARY

The subject of the present invention is a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, according to U.S. patent application Ser. No. 449,618 (priority: Switzerland: 3619/73 of Mar. 13, 1973) wherein a mixture consisting of:

a. 20 – 60% by weight of a polybutadiene having an average molecular weight of 750–2,000 and an iodine number between 300 and 450, b. 10–60% by weight of a hydrocarbon resin of predominantly aliphatic structure, having a viscosity between 30 and 800 cP (measured in 70% strength solution in toluene at 20°C) and an iodine number between 160 and 400, consisting of $b_1$. 20–80% by weight of polyisoprene, $b_2$. 5–35% by weight of cyclopentadiene and/or dicyclopentadiene, $b_3$. 5–50% by weight of further mono-unsaturated or poly-unsaturated hydrocarbons with 5–6 C atoms which are of predominantly aliphatic or cycloaliphatic structure and c. 5–40% by weight of a fatty acid glyceride ester, wherein the fatty acid radical contains 16–18 C atoms and the fatty acid glyceride ester has an iodine number between 140 and 220, is pre-polymerised by heating to 200°–270°C until the reaction mixture of components $a$, $b$ and $c$, which has an initial viscosity of about 100–300 sec (measured according to DIN 4 sec 53,211), displays viscosities between 500 and 2,000 sec (measured according to DIN 4 sec 53,211), the resulting mixture is then reacted with d. 10–20% by weight of maleic anhydride at 180°–190°C until no further free maleic anhydride is present and e. in the resulting adduct the anhydride groups present are opened by hydrolysis with water or by alcoholysis with the amount of monohydric alcohols with 1–4 C atoms required to form the half-ester, characterised in that in the reaction carried out to modify the process products, 5 to 25% by weight, relative to the total weight of the components (a), (b), (c) and (d), of adducts of $\alpha,\beta$-unsaturated aliphatic dicarboxylic acids to resin acids and/or adducts which are partially or completely esterified with polyhydric saturated aliphatic alcohols, are co-used as component (f).

The following may be mentioned as examples, to be used individually or as mixtures, of resin acids suitable for the synthesis of the adduct: Abietic acid, laevopimaric acid, neoabietic acid, and palustric acid, as well as partially hydrogenated abietic acid, such as dehydroabietic acid and dihydroabietic acid. However, the resin acids mentioned should still have an iodine number of at least 100.

Mixtures of natural resin acids, such as balsam colophony, pine balsam, root resin, tall resin and similar products, and their partial hydrogenation products, are also very suitable for the manufacture of the adducts.

Suitable $\alpha,\beta$-unsaturated dicarboxylic acids for the manufacture of the adducts are maleic acid, fumaric acid, aconitic acid, citraconic acid and their anhydrides, where they exist; maleic anhydride and fumaric acid are particularly preferred.

The molar ratio of the $\alpha,\beta$-unsaturated dicarboxylic acid to the resin acid in the adduct lies within the limits of 0.2:1 to 1:1.

The polycarboxylic acids obtained by adduct formation between the resin acid and the $\alpha,\beta$-unsaturated dicarboxylic acid or its anhydride can either be in the form of free polycarboxylic acids or they can be partially or completely esterified with polyhydric aliphatic alcohols.

The following may be mentioned as examples of such polyhydric alcohols which are suitable for the esterification of the adducts: Glycerine, trimethylolpropane, pentaerythritol, 1,6-hexanediol and 1,4-butanediol. Pentaerythritol and trimethylolpropane are particularly preferred.

The compounds employed as component (f) should have viscosities between 80 and 250 cP, measured at 50% strength in xylene at 20°C. The melting points of these products should lie in the range from 100° to 160°C. In the preferred embodiment, the viscosities of the component (f) are between 120 and 180 cP, measured 1:1 in xylene at 20°C, and their melting point is between 100° and 130°C.

The component (f) can be added in accordance with different variants. Firstly, according to variant I, the component (f) can be added to the components (a) to (c) according to the process described in U.S. patent application Ser. No. 449,618 and can then be reacted further in accordance with the process of U.S. patent application Ser. No. 449,618.

However, according to variant II, the component (f) can also be reacted according to stage (d) of U.S. patent application Ser. No. 449,618 together with the maleic anhydride.

In these cases, that is to say process variants I or II, the component (f) is preferably employed as the free polycarboxylic acid which is not esterified. In some cases it can also be possible to employ the component (f) in the esterified form, but in each case the increase in viscosity and the compatibility must be tested accurately during the reaction, that is to say the viscosity in stage (c) must not be higher than 2,000 sec (measured according to DIN 4 sec 53,211) and, at least after stage (d), a resin which is very largely clear must have been produced. If these conditions are fulfilled, the type and amount of the esterified component (f) employed is unsuitable for these process steps.

In a further process variant III, the component (f) can also be added only after the end of stage (e) according to the process indicated in U.S. patent application Ser. No. 449,618 in which case the component (f) is then incorporated into the synthetic resin by heating at temperatures between 80° and 150°C.

This process variant III is preferably employed if the component (f) is partially or completely esterified. If a partial ester is used, a reaction temperature range from 80° to 110°C is preferred.

The reaction in process variant III must be continued until a clear resin has been produced. The viscosities of the end products should be between 40 and 170 sec (DIN 4 sec 53,211) measured at 50% strength by weight in ethylene glycol monobutyl ether at 20°C.

In another process variant IV, a part of the component (a) is first-pre-polymerised with the components (b) and (c), the remainder of the component (a) is then added to the prepolymer and after completion of stages (d) and (e) the product is reacted with the component (f) whilst heating at temperatures between 80° and 150°C. Finally it is also possible, in a variant V, first to pre-polymerise a part of the component (a) and a part of the component (c) with component (b), then to add further amounts of component (a) and further amounts of component (c) to the pre-polymer and then to react the resin, after completion of stages (d) and (e), with the component (f) whilst warming at 80° to 150°C.

These two process variants IV and V are used preferentially when the proportion of the component (b) in the synthetic resin is to be between 5 and 15% by weight.

In the preferred embodiment of these two process variants (IV + V) the prepolymerisation of the component (b) with parts of the component (a) and (c) is carried out until a viscosity between 1,500 and 3.000 sec (DIN 4 sec 53,211) is reached.

A further embodiment of the process of the present invention is characterised in that the component (b) is employed in amounts of 5 to 15% by weight, based on the weight of the end product.

A further special embodiment of the process of the present invention according to variant I, II and III is characterised in that the component (a) is employed in amounts of 27–50% by weight, the component (b) is employed in amounts of 10–25% by weight, the component (e) is employed in amounts of 12–25% by weight, the component (d) is employed in amounts of 15–20% by weight and the component (c) is employed in amounts of 5–20% by weight, based on the weight of the end product.

A further special embodiment of the process of the present invention, according to variant IV or V, is characterised in that the component (a) is employed in amounts of 40–55% by weight, the component (b) is employed in amounts of 5–15% by weight, the component (c) is employed in amounts of 3–10% by weight, the component (d) is employed in amounts of 12–18% by weight and the component (f) is employed in amounts of 10–20% by weight, based on the end product.

A further special embodiment of the process of the present invention, according to variant I or II, is characterised in that in each case the component (f) is employed in portions.

In the preferred embodiment, the components (a), (b), (c), (d) and (f) should be present in the following amounts in the end product:

Binder according to variant I, II and III:
Component (a): 30 – 50% by weight,
Component (b): 10 – 30% by weight,
Component (c): 10 – 25% by weight,
Component (d): 12 – 18% by weight, and Component (f): 5 – 25% by weight.
Binder according to variant IV and V:
Component (a): 40 – 60% by weight,
Component (b): 5 – 15% by weight,
Component (c): 5 – 15% by weight,
Component (d): 14 – 18% by weight and
Component (f): 10 – 20% by weight.

Manufacture of the hydrocarbon resin 1 (component b):

1,000 g of toluene and 75 g of $BF_3$-etherate are mixed and the mixture is cooled to +5°C whilst stirring. 1,500 g of a $C_5$ cut of the following composition: 11.4% by weight of pentane, 18.9% by weight of isoprene, 12% by weight of 1,3-pentadiene, 25.3% by weight of cyclopentadiene and dicyclopentadiene and 20% by weight of further unsaturated constituents and 12% by weight of further saturated constituents with 5 – 6 carbon atoms in the molecule are then added dropwise at a speed such that the temperature does not exceed 10°C, whilst stirring.

After the end of the addition, the temperature in the reaction batch is allowed to rise to 15°–20°C and the reaction is allowed to continue for a further 3 hours whilst continuing the stirring. 150 g of $Ca(OH)_2$ + 10 g of $H_2O$ are added whilst cooling. The batch is then filtered and concentrated to remove the toluene and the unreacted monomers. 400 g of an unsaturated hydrocarbon resin having a viscosity of 120 cP (measured at 70% strength in toluene at 20°C) and an iodine number of 220 are left.

Manufacture of the hydrocarbon resin 2 (component b):

400 g of toluene are cooled at +5°C whilst stirring. 2,000 g of a $C_5$ cut of the following composition: 15.4% by weight of n-pentane, 5.3% by weight of cyclopentane, 13% by weight of n- and iso-pentene, 4.2% by weight of cyclopentene, 15.9% by weight of 1,3-pentadiene, 18.6% by weight of isoprene, 14.5% by weight of cyclopentadiene + dicyclopentadiene and 10.6% by weight of other monomers with 6 C atoms, and a solution of 50 g of $BF_3$-etherate in 400 g of toluene are then added dropwise in such a way that the temperature does not rise above 10°C. The reaction is then allowed to continue for a further 2 hours at 5°–10°C, the temperature is then allowed to rise to 15°C and the reaction is allowed to continue for a further 3 hours at this temperature. 187 g of sodium bicarbonate and 2 ml of water are added. The mixture is then filtered and concentrated. 1,000 g of an unsaturated hydrocarbon resin having a viscosity of 80 – 100 cP (measured at 70% strength by weight in toluene at 20°C) and an iodine number of 250–290 are left.

Hydrocarbon resin 3

Commercially available hydrocarbon resin from 36% by weight of cyclopentadiene, 15% by weight of methylcyclopentadiene and 30% by weight of isoprene (Escopol from Messrs. Esso), of average molecular weight 6,000 and iodine number 190.

Adduct I of maleic acid and colophony

Commercially available adduct based on colophony/maleic anhydride, having a melting point of 140°–150°, an acid number of 270–290, a total iodine number of approx. 100 and a viscosity of 100–200 cP, measured at 50% strength in xylene at 20°C. Saponification number: 330 – 350. Commercially available under the name Gramal 525.

Adduct II of fumaric acid and colophony

Commercially available adduct synthesised from: 81% by weight of colophony, 13% by weight of pentaerythritol and 6% by weight of fumaric acid, having a melting point of 115°–118°C, an acid number of less than 20 and a viscosity of 200–300 cP, measured 1:1 in white spirit at 20°C.

EXAMPLE 1

450 g of a polybutadiene having an iodine number of 450 and an average molecular weight of approx. 1,400, with 65–75% of the double bonds having the 1,4-cis configuration, 25–35% having the 1,4-trans configuration and less than 1% having the 1,2-vinyl configuration, are mixed with 175 g of an unsaturated hydrocarbon resin 3, 200 g of linseed oil and 100 g of adduct 1. The viscosity of the mixture is approx. 150 sec. The batch is heated to 250°C under an inert gas until the viscosity according to DIN 4 sec 53,211 is 630 sec. 175 g of maleic anhydride are then added all at once at 160°C and the temperature is kept at between 180° and 190°C until the content of free maleic anhydride is practically zero. 60 g of methanol and 0.5 g of triethylamine are then added at 80°C and the temperature is raised to 100°C for 1 hour. This opens the anhydride groups in the adduct. The synthetic resin is then diluted with ethylene glycol monoethyl ether to a solids content of 75% by weight.

EXAMPLE 2

450 g of a polybutadiene having an iodine number of 450 and an average molecular weight of approx. 1,400, with 65–76% of the double bonds having the 1,4-cis-configuration, 25–35% having the 1,4-trans configuration and less than 1% having the 1,2-vinyl configuration, are mixed with 175 g of unsaturated hydrocarbon resin 3 and 200 g of linseed oil. The viscosity of the mixture is approx. 150 sec. The batch is heated to 250°C under an inert gas until the viscosity according to DIN 4 sec 53,211 is 630 sec. 175 g of maleic anhydride and 100 g of adduct 1 are then added all at once at 160°C and the temperature is kept at between 180° and 190°C until the content of free maleic anhydride is practically zero. 60 g of methanol and 0.5 g of triethylamine are then added at 80°C and the temperature is raised to 100°C for 1 hour. This opens the anhydride groups in the adduct. The synthetic resin is then diluted with ethylene glycol monoethyl ether to a solids content of 75% by weight.

EXAMPLE 3

450 g of a polybutadiene having an iodine number of 450 and an average molecular weight of approx. 1,400, with 65–75% of the double bonds having the 1,4-cis-configuration, 25–35% having the 1,4-trans configuration and less than 1% having the 1,2-vinyl configuration, are mixed with 175 g of unsaturated hydrocarbon resin 3, 200 g of linseed oil and 50 g of adduct 1. The viscosity of the mixture is approx. 200 sec. The batch is heated to 250°C under an inert gas until the viscosity according to DIN 4 sec 53,211 is 690 sec. 175 g of maleic anhydride and 50 g of adduct 1 are added all at once at 160°C and the temperature is kept at between 180° and 190°C until the content of free maleic anhydride is practically zero. 60 g of methanol and 0.5 g of triethylamine are then added at 80°C and the temperature is raised to 100°C for 1 hour. This opens the anhydride groups in the adduct. The synthetic resin is then diluted with ethylene glycol monoethyl ether to a solids content of 75% by weight.

EXAMPLE 4

500 g of a polybutadiene having an iodine number of 450 and an average molecular weight of approx. 1,400, with 65–75% of the double bonds having the 1,4-cis configuration, 25–35% having the 1,4-trans configuration and less than 1% having the 1,2-vinyl configuration, are mixed with 200 g of unsaturated hydrocarbon resin 1 and 125 g of linseed oil. The viscosity of the mixture is approx. 150 sec. The batch is heated to 250°C under an inert gas until the viscosity according to DIN 4 sec 53,211 is 630 sec. 175 g of maleic anhydride are then added all at once at 160°C and the temperature is kept at between 180° and 190°C until the content of free maleic anhydride is practically zero. 60 g of methanol and 0.5 g of triethylamine are then added at 80°C and the temperature is raised to 100°C for 1 hour. This opens the anhydride groups in the adduct.

250 g of adduct II are then added. The mixture is kept at 120°–130°C until a clear solution has been produced. The synthetic resin is then diluted with ethylene glycol monoethyl ether to a solids content of 70%.

EXAMPLE 5

550 g of a polybutadiene having an iodine number of 450 and an average molecular weight of approx. 1,400, with 65–75% of the double bonds having the 1,4-cis configuration, 25–35% having the 1,4-trans configuration and less than 1% having the 1,2-vinyl configuration, are mixed with 200 g of unsaturated hydrocarbon resin 3 and 75 g of linseed oil. The viscosity of the mixture is approx. 150 sec. The batch is heated to 250°C under an inert gas until the viscosity according to DIN 4 sec 53,211 is 630 sec. 175 g of maleic anhydride are then added all at once at 160°C and the temperature is kept at between 180° and 190°C until the content of free maleic anhydride is practically zero. 60 g of methanol and 0.5 g of triethylamine are then added at 80°C and the temperature is raised to 100°C for 1 hour.

200 g of adduct II are then added and the mixture is heated to 110°–120°C until a clear solution has been produced. The synthetic resin is diluted with ethylene glycol monoethyl ether to a solids content of 70%.

EXAMPLE 6

100 g of a polybutadiene having an iodine number of 450 and an average molecular weight of 1,400 are mixed with 150 g of unsaturated hydrocarbon resin 3 and 75 g of linseed oil. The batch is heated to 250°–270° C under an inert gas until the viscosity, according to DIN 4 sec 53,211 is 2,500 sec.

A further 500 g of the polybutadiene are added to this mixture. After mixing, 200 g of maleic anhydride are added at 160°C and the temperature is kept at between 180° and 190°C until the content of free maleic anhydride has fallen practically to zero. 50 g of methanol and 0.5 g of triethylamine are then added at 80°C and the temperature is raised to 100°C for 1 hour. 200 g of adduct II are added to this synthetic resin and the batch is warmed at 120°–140°C until a clear solution has been produced.

The synthetic resin is then diluted with isopropanol to a solids content of 75% by weight.

EXAMPLE 7

100 g of a polybutadiene having an iodine number of 450 and an average molecular weight of 1,400 are mixed with 100 g of unsaturated hydrocarbon resin 2 and 50 g of linseed oil. The batch is heated to 250°–270°C under an inert gas until the viscosity, according to DIN 4 sec 53,211 is 2,300 sec.

A further 500 g of the polybutadiene and 75 g of linseed oil. are added to this mixture. After mixing, 175 g of maleic anhydride are added at 160°C and the temperature is kept at between 180° and 190°C until the content of free maleic anhydride has fallen practically to zero. 50 g of methanol and 0.5 g of triethylamine are then added at 80°C and the temperature is raised to 100°C for 1 hour. 250 g of adduct II are added to this synthetic resin and the batch is warmed at 120°–140°C until a clear solution has been produced.

The synthetic resin is then diluted with isopropanol to a solids content of 75% by weight.

The synthetic resins according to Examples 1–3, after neutralisation with ammonia, electrophoretic application in coating thicknesses of 20 – 22µ, and stoving (30 minutes at 180°C) give lacquer films with good corrosion resistance in the salt spray test, whilst the synthetic resins according to Examples 4 – 7 give very good corrosion resistance in the salt spray test.

All the electrophoresis baths are distinguished by excellent throwing power, and no excess-coating occurs even at deposition voltages above 350 volt. Furthermore it is conspicuous that at lower deposition voltages (160–220 V) good values of the throwing power are also still achieved.

EXAMPLES 8 to 16

The procedure followed is in accordance with the instructions in Example 1, but the amounts of raw material indicated in Table 1 were employed.

EXAMPLES 17 to 23

The procedure followed is in accordance with the instructions in Example 2, but the amounts of raw material indicated in Table 2 were employed.

EXAMPLE 24

The procedure followed is in accordance with the instructions in Example 3, but the amounts of raw material indicated in Table 2 were employed.

Comparison experiments to demonstrate the technical advance achieved:

The following lacquers were compared with one another:

1. Synthetic resin used as binder 1: According to Example 6 of U.S. patent application Ser. No. 449,618;
2. Synthetic resin used as binder 2: According to Example 20 of U.S. patent application Ser. No. 449,618;
3. Synthetic resin used as binder 3: According to Example 1 of the present invention;
4. Synthetic resin used as binder 4: According to Example 2 of the present invention;
5. Synthetic resin used as binder 5: According to Example 4 of the present invention;
6. Synthetic resin used as binder 6: According to Example 5 of the present invention;
7. Synthetic resin used as binder 7: According to Example 13 of the present invention;

8. Synthetic resin used as binder 8: According to Example 21 of the present invention.

The synthetic resins used as binders were pigmented with a mixture of equal parts of titanium dioxide and aluminum silicate and a little carbon black, in the pigment/binder ratio of 0.3:1, and after neutralisation with ammonia were diluted to a solids content of 13% by weight.

The values of the throwing power at various voltages were determined.

|  | Throwing power at 150 V | Throwing power at 200 V | Throwing power at 300 V | Throwing power at 350 V |
|---|---|---|---|---|
| Binder 1 | 20/5/0 | 24/8/2 | 24/20/10 | — |
| Binder 2 | — | 19/13/2 | 22/20/12 | — |
| Binder 3 | — | 18/11/2 | 19/18/11 | — |
| Binder 4 | — | 19/12/9 | 17/16/16 | 20/20/19 |
| Binder 5 | 18/15/2 | 18/15/9 | 18/16/14 | — |
| Binder 6 | 20/10/3 | 20/14/7 | 20/18/18 | — |
| Binder 7 | — | 15/12/4 | 19/18/15 | 20/20/17 |
| Binder 8 | 14/7/4 | 15/10/8 | 17/16/15 | 22/18/16 |

The throwing powers were measured in accordance with the following method:

A 50 cm long, 5 cm wide steel strip is introduced into a plastic tube of 6 cm diameter which carries a disc-shaped copper cathode at the bottom, in such a way that the distance to the cathode is 2 cm.

The deposition is carried out at various electrical voltages.

The coating thickness at 2, 15 and 45 cm distance from the lower edge is measured.

It can be seen from the table that with the binders of the present invention acceptable throwing powers are achieved even at voltages around 200 volt and that even at high voltages no excess-coating takes place, that is to say the binders can be employed over a wide volage range and even if the coating time is extended there is no danger of excess coating.

EXAMPLE 25

The procedure followed is as in Example 16 but the ring opening is carried out with ethanol instead of methanol.

EXAMPLE 26

The procedure followed is as in Example 16 but the ring opening is carried out propanol instead of methanol.

EXAMPLE 27

The procedure followed is as in Example 16 but the ring opening is carried out with butanol instead of methanol.

We claim:
1. Process for the manufacture of a heat-curable synthetic resin based on a reaction product of maleic anhydride with a mixture of polybutadiene, an unsaturated hydrocarbon resin and an unsaturated fatty acid glyceride ester, which can be diluted with water and is suitable for the electrophoretic coating process wherein a mixture consisting of:
   a. 20–60% by weight of a polybutadiene having an average molecular weight of 750–2,000 and an iodine number between 300 and 450,
   b. 10–60% by weight of a hydrocarbon resin of predominantly aliphatic structure, having a viscosity between 30 and 800 cP, measured in 70% strength solution in toluene at 20°C and an iodine number of between 160 and 400, consisting of
      $b_1$. 20–80% by weight of polyisoprene,
      $b_2$. 5–35% by weight of cyclopentadiene and/or dicyclopentadiene, and
      $b_3$. 5–50% by weight of further mono-unsaturated or poly-unsaturated hydrocarbons with 5–6 C atoms which are of predominantly aliphatic or cycloaliphatic structure, and
   c. 5–40% by weight of a fatty acid glyceride ester, wherein each fatty acid radical contains 16–18 C

| Example | a<br>% by weight of polybutadiene | b<br>% by weight of HC 3 + | c<br>% by weight of oil | f<br>% by weight of adduct I | d<br>% by weight of MA ++ | e<br>Anhydride group opened with |
|---|---|---|---|---|---|---|
| *f reacted conjointly with a, b and c* | | | | | | |
| 8 | 43.6 | 18.2 | 10.9 | 9.1 | 18.2 | $CH_3OH$ |
| 9 | 45.7 | 19.0 | 11.4 | 4.8 | 19.0 | $CH_3OH$ |
| 10 | 40.6 | 17.0 | 10.2 | 15.2 | 17.0 | $CH_3OH$ |
| 11 | 43.6 | 10.9 | 18.2 | 9.1 | 18.2 | $CH_3OH$ |
| 12 | 45.7 | 11.4 | 19.0 | 4.8 | 19.0 | n-butanol |
| 13 | 45.5 | 9.1 | 20.0 | 9.1 | 16.3 | $CH_3OH$ |
| 14 | 47.5 | 11.4 | 17.2 | 4.8 | 19.0 | $CH_3OH$ |
| 15 | 45.5 | 5.4 | 23.6 | 9.1 | 16.4 | $CH_3OH$ |
| 16 | 51.0 | 5.4 | 18.2 | 9.1 | 16.3 | $CH_3OH$ |

| Example | a<br>% by weight of polybutadiene | b<br>% by weight of HC resin 3 + | c<br>% by weight of oil (linseed oil) | f<br>% by weight of adduct | d<br>% by weight of MA ++ | e<br>Anhydride group opened with |
|---|---|---|---|---|---|---|
| *f added with d* | | | | | | |
| 17 | 43.6 | 18.2 | 10.9 linseed oil | 9.1 | 18.2 | $CH_3OH$ |
| 18 | 45.7 | 19.0 | 11.4 | 4.8 | 19.0 | $CH_3OH$ |
| 19 | 40.6 | 17.0 | 10.2 | 15.2 | 17.0 | $CH_3OH$ |
| 20 | 43.6 | 10.9 | 18.2 | 9.1 | 18.2 | $H_2O$ |
| 21 | 45.5 | 9.1 | 20.0 | 9.1 | 16.3 | $CH_3OH$ |
| 22 | 45.5 | 5.4 | 23.6 | 9.1 | 16.4 | n-Butanol |
| 23 | 51.0 | 5.4 | 18.2 | 9.1 | 16.3 | $CH_3OH$ |
| *50% of f added with a, b and c, 50% of f added with d:* | | | | | | |
| 24 | 45.5 | 10.9 | 16.3 | 9.1 | 18.2 | $CH_3OH$ |

+HC resin = hydrocarbon resin
++MA = maleic anhydride atoms and the fatty acid glyceride ester has an iodine number between 140 and 220, is pre-polymerized by heating to 200°–270°C until the reaction mixture of components (a), (b) and (c), which has an initial viscosity of about 100 to 300 sec., measured according to DIN 53,211, displays a viscosity between 500 and 2,000 sec., measured according to DIN 53,211, the resulting mixture is then reacted with d. 10–20% by weight of maleic anhydride at 180° to 190°C until no further free maleic anhydride is present, and e. in the resulting adduct, the anhydride groups present are opened by hydrolysis with water or alcoholysis with the amount of monohydric alcohols with 1–4 C atoms required to form the half-ester, characterized in that the reaction is carried out to modify the process product by co-using as component (f), 5 to 25% by weight, relative to the total weight of the components (a), (b), (c) and (d), of an adduct of an α,β-unsaturated aliphatic dicarboxylic acid to a resin acid or such an adduct which is partially or completely esterified with a polyhydric saturated aliphatic alcohol.

2. Process according to claim 1, characterised in that the component (f) is reacted conjointly with the components (a), (b) and (c).

3. Process according to claim 1, characterised in that the component (f) is reacted conjointly with the maleic anhydride.

4. Process according to claim 1, characterised in that the component (f) is reacted, after the hydrolysis or alcoholysis (reaction stage (c)) with the synthetic resin obtained (according to (a), (b), (c), (d) and (e)), by heating to temperatures between 80° and 150°C.

5. Process according to claim 1, characterised in that a part of the component (a) is pre-polymerised with the components (b) and (c), the remaining part of the component (a) is added to the pre-polymer and after completion of reaction ((d) and (e)) the component (f) is added to the synthetic resin obtained and is incorporated therein by heating to temperatures between 80° and 150°C.

6. Process according to claim 1, characterised in that a part of the component (a) and a part of the component (c) is pre-polymerised with the component (b), the remaining part of the component (a) and the remaining part of the component (c) is added to the pre-polymer and after completion of the reaction (d)) and (e)) the component (f) is added to the synthetic resin obtained and is incorporated therein by heating to temperatures between 80° and 150°C.

7. Process according to claim 2, characterised in that the component (f) is employed non-esterified, as the free polycarboxylic acid.

8. Process according to claim 3, characterised in that the component (f) is employed non-esterified, as the free polycarboxylic acid.

9. Process according to claim 4, characterised in that the component (f) is employed esterified.

10. Process according to claim 9, characterised in that abietic acid is employed as the resin acid.

11. Process according to claim 5, characterised in that the component (b) is employed in amounts of 5 to 15% by weight based on the weight of the end product.

12. Process according to claim 2 characterised in that the component (a) is employed in amounts of 27–50% by weight, the component (b) is employed in amounts of 10–25% by weight, the component (c) is employed in amounts of 12–25% by weight, the component (d) is employed in amounts of 15–20% by weight and the component (e) is employed in amounts of 5–20% by weight, based on the weight of the end product.

13. Process according to claim 4 characterised in that the component (a) is employed in amounts of 40–55% by weight, the component (b) is employed in amounts of 5–15% by weight, the component (c) is employed in amounts of 3–10% by weight, the component (d) is employed in amounts of 12–18% by weight and the component (f) is employed in amounts of 10–20% by weight, based on the end product.

14. Process according to claim 1 wherein the resin acid is a natural resin acid or a partially hydrogenated resin acid.

15. Process according to claim 2 wherein component (f) is reacted in portions with a mixture of components (a), (b) and (c).

16. The heat-curable synthetic resin, manufactured by the process according to claim 1.

* * * * *

UNITED STATES PATENT OFFICE
CERTIFICATE OF CORRECTION

Patent No. 3,959,198    Dated May 25, 1976

Inventor(s) Bernhard Broecker et al

It is certified that error appears in the above-identified patent and that said Letters Patent are hereby corrected as shown below:

Column 11, line 31, "(reaction stage (c) )" should read -- (reaction stage (e) ) --.

Column 12, line 23 "the component (c)" should read -- the component (f) --.

Column 12, line 15, "claim 9" should read -- claim 14 --.

Signed and Sealed this

Fourteenth Day of December 1976

[SEAL]

Attest:

RUTH C. MASON
*Attesting Officer*

C. MARSHALL DANN
*Commissioner of Patents and Trademarks*